June 17, 1947.  E. G. BAKER  2,422,517
GAS ENGINE FUEL INDUCTION MEANS
Filed Dec. 21, 1944

INVENTOR,
ERWIN G. BAKER,
By Herbert A. Minturn,
ATTORNEY.

Patented June 17, 1947

2,422,517

UNITED STATES PATENT OFFICE 2,422,517

GAS ENGINE FUEL INDUCTION MEANS

Erwin G. Baker, Indianapolis, Ind.

Application December 21, 1944, Serial No. 569,250

3 Claims. (Cl. 123—122)

This invention relates to means for induction of fuel into a gas engine for combustion therein, and particularly has to do with the conversion of liquid fuel into substantially complete gaseous form as opposed to mere atomization.

An important advantage of the invention is that unusually high mileage is secured by its use from each gallon of liquid fuel without any mechanical change in the engine itself, which fact means that the invention may be applied not only to newly designed engines in the source of manufacturing, but also may be applied to the standard types of engines already in operation so as to effect a material saving in fuel.

A further important advantage of the invention is that through its use, not only is the fuel consumption greatly reduced, but at the same time there is no material change in the characteristic operation of the engine itself.

A still further important advantage of the invention is that it may be quite simply and cheaply produced in quantity to permit the general use thereof.

Figure 2:
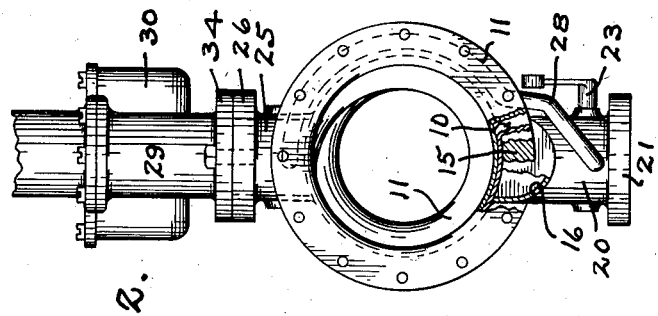
Figure 1:
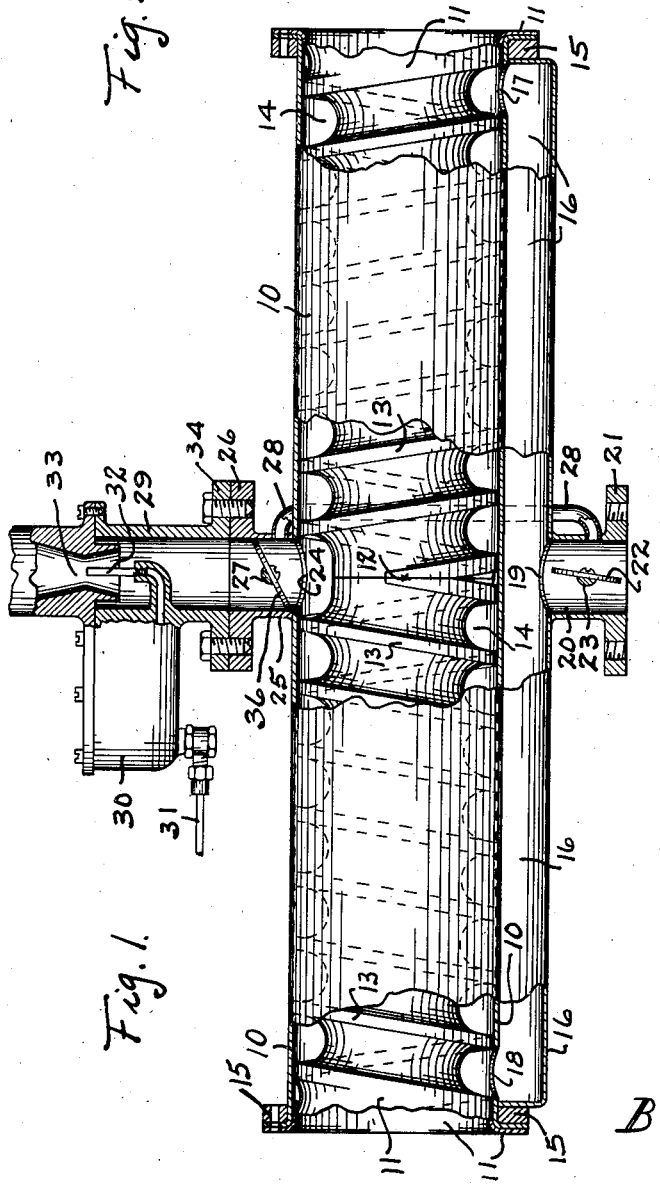

These and many other objects and advantages of the invention will become apparent to those versed in the art in the following description of one particular form of the invention as illustrated in the accompanying drawing, in which Fig. 1 is a view in side elevation and partial section of a structure embodying the invention;

Fig. 2, a view in end elevation and partial section; and

Figure 3:
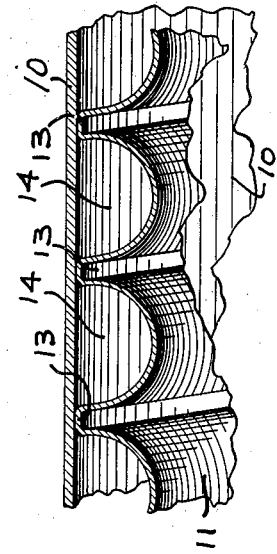

Fig. 3, a detail in section on an enlarged scale through the tubular walls of the heating means.

Like characters of reference indicate like parts in the several views in the drawing.

A very effective form of the invention is illustrated and described herein to have a metal cylindrical shell or tube 10. Within this tube 10 is fixed a right and left hand externally spirally grooved tube generally designated by the numeral 11. In practice, a simple method of manufacture would be to roll in the spiral in one direction on one length of tube and roll in the oppositely spiralled groove on another length of tube and then join these tubes centrally within the shell 10 on a line 12, it being understood that this juncture would be so made as to be gas-tight under all conditions.

Referring particularly to the detail in Fig. 3, this inner tube 11 is formed to have a spiral rib 13 extending therearound and in contact with the inner face of the wall of the tube 10 whereby a substantially semi-cylindrical spiral passageway 14 extends around the tube between windings of the rib 13 to have the outer side of that passageway closed off by the wall of the tube 10. The tube 11 is preferably made out of a highly heat conducting metal, such as copper for example, which also lends itself to drawing to the desired spirally grooved shape.

The ends of the tube 11 are sealed off from passage therepast into the tube 10. One particular means for accomplishing this sealing is illustrated in Fig. 1 particularly where the outer ends of the shell 10 are flanged outwardly over a ring 15, and then the ends of the tube 11 in each instance are flanged over and around against the flanged ends of the tube 10. The outer face of the flanged ends of the tube 11 in each instance form a seat against which connecting fittings (not shown) may be applied and drawn up snugly for a substantially gas-tight fit.

As indicated in Fig. 1, the spiral passageways 14 lead off from the central part of the tube 10 in each longitudinal direction to terminate at the respective ends of the tube 10.

From suitable zones at the end portions of the tube 10, a tube 16 interconnects through ports 17 and 18 in those zones through the shell 10, the tube 16 extending substantially throughout the length and outside of the tube 10. In the present showing, this tube 16 is substantially semicircular in cross section, the outer face of the tube 10 forming the closure across the top side thereof.

The tube 16 is provided with a central under side port 19 around which is fitted externally thereof a nipple 20 carrying a suitable mounting flange 21 about its lower end. A butterfly valve 22 is mounted within the nipple 20 on a transverse shaft 23.

A port 24 is provided in the shell 10 at the central zone thereof centered on the line 12 between the oppositely directed ribs 13, Fig. 1. A nipple 25 is fixed to the tube 10 externally thereof over the port 24 and carries a mounting flange 26 on its upper end. Within the nipple 25 is a butterfly valve 36 mounted on an operating transverse shaft 27. The nipple 25 is interconnected from a point below the valve 36 when in closed position by means of a by-pass tube 28 with the lower nipple 20 at a point below the valve 22 when in its closed position.

A suitable fuel atomizing device is interconnected with the nipple 25. This device may be some such means as a carburetor in its elemental form, herein designated generally by the numeral 29, having the usual fuel level float chamber 30 supplied in any suitable manner with fuel from a supply pipe 31 and having a jet nozzle 32 interconnected therewith in the usual manner to terminate substantially within the Venturi throat 33 whereby air traveling through that throat will produce a partial vacuum in the usual manner to withdraw fuel from the open top end of the nozzle 32 to pick up that fuel in an atomized form in the stream of air flowing therepast. This device 29 in the present form is shown as being mounted directly on the flange 26 by an attaching flange 34.

The lower nipple 20 is interconnected in any suitable manner through its flange 21 with the intake manifold (not shown) of the gas engine to which the invention is to be applied. In other words, when the engine is in operation, a partial vacuum will exist at the lower entrance into the nipple 20. Also, one end of the tube 10 is interconnected with the exhaust gas discharge from the same engine to have that gas travel through the inside of the tube 11 across the inside rounded sides of the grooves 14, one set spiralled oppositely to the other, and discharge from the other end of the tube 11 as a means of not only heating intensely that tube 11 but also as a means for silencing and extracting heat from the exhaust gases as finally discharged. In other words, the tube 11 serves in itself as a quite effective muffler.

In operation, with the partial vacuum applied at the lower end of the nipple 20, and assuming that the valve 22 is closed, a degree of vacuum will also be applied immediately under the upper valve 26 in the nipple 25 by reason of the presence of the by-pass tube 28 around the tube 10. Generally in such cases, the valve 36 will be closed or partially closed for idling or starting conditions of the engine, it being understood that the valve 36 will operate generally in practice never to an absolutely closed position so that some air will be drawn through the throat 33 at all times the engine is turning over. Then in operation, both valves 22 and 36 would be opened to some further degree whereby the interior of the tube 16 and also the spiral passageways 14 within the tube 10 would tend to be exhausted so that an air stream coming through the throat 33 in response to that partial degree of vacuum would enter the port 24 within the tube 10 to be divided to flow spirally around the tube 11 in opposite directions to the outer ends thereof, and discharge by separate streams, one at each end, through the respective ports 17 and 18 into the tube 16 to meet and co-mingle at the port 19 through which the combined streams would flow through the nipple 20 and on into the engine manifold.

The air flow through the throat 33 will pick up the fuel from the nozzle 32 in a somewhat coarsely atomized state, and this air and atomized fuel mixture will strike the heated tube 11 whereby the atomized particles will be substantially completely gasified to mix intimately during their whirling action with the air so that a completely carbureted mixture without "heavy" and "thin" spots is obtained and delivered directly into the engine manifold.

While I have herein shown my invention in the one particular form, it is obvious that mechanical changes may be made without departing from the spirit of the invention, and I therefore do not desire to be limited to that precise form beyond the limitations as may be imposed by the following claims.

I claim:

1. In gas engine fuel induction means, the combination with a fuel atomizer, of an open ended housing tube; an open ended heat transfer tube within the housing tube; a spiral rib around the transfer tube in intimate contact with the wall of said housing tube, the wall of the transfer tube being depressed between adjacent crests of the rib to form a spiral passageway around the transfer tube bounded thereby and the housing tube thereacross; said housing tube having an entry port over said passageway; conduit means interconnecting said port with said atomizing means; said housing tube having a discharge port toward the end of said passageway leading from said entry port; and conducting means leading from said discharge port; said transfer tube being gas sealed from said housing tube; a valve in said conduit means; a second valve in said conducting means; and a by-pass conduit leading from said conducting means outside of the second valve and to said conduit means between said valve and said housing tube.

2. For mounting between a carburetor and an engine fuel intake member, a tube having openings, one at each end portion, and one on its side; a heat transfer tube within the said first tube, said transfer tube having a spiral rib therearound leading in opposite directions from a central zone and in substantial contact with said first tube, thereby defining a spiral chamber between the two tubes of opposite thread from said central zone; said first tube having its said side opening at said central zone; the outer ends of said transfer tube being sealed off at the outer ends of said first tube; said transfer tube having a spiral valley therearound from its inner side, complementing said rib, whereby an interior corrugated surface extends in opposite spirals from said central zone; a conduit interconnecting outer, opposite end portions of said spiral chamber and having an outlet disposed between those opposite end portions.

3. For mounting between a carburetor and an engine fuel intake member, a tube having openings, one at each end portion, and one on its side; a heat transfer tube within the said first tube, said transfer tube having a spiral rib therearound leading in opposite directions from a central zone and in substantial contact with said first tube, thereby defining a spiral chamber between the two tubes of opposite thread from said central zone; said first tube having its said side opening at said central zone; the outer ends of said transfer tube being sealed off at the outer ends of said first tube; said transfer tube having a spiral valley therearound from its inner side, complementing said rib, whereby an interior corrugated surface extends in opposite spirals from said central zone; a conduit interconnecting outer, opposite end portions of said spiral chamber and having an outlet disposed between those opposite end portions; and a by-pass conduit leading from said first tube side opening and discharging at said conduit outlet; and a by-pass conduit control valve located between said conduit and said by-pass discharge.

ERWIN G. BAKER.

REFERENCES CITED

The following references are of record in the file of this patent:

UNITED STATES PATENTS

| Number | Name | Date |
|---|---|---|
| 1,431,326 | Perry | Oct. 10, 1922 |
| 1,213,305 | Verderber | Jan. 23, 1917 |
| 1,395,677 | Ivor | Nov. 1, 1921 |
| 2,374,609 | McCollum | Apr. 24, 1945 |